United States Patent
Tanabe et al.

(10) Patent No.: US 9,553,336 B2
(45) Date of Patent: Jan. 24, 2017

(54) POWER SUPPLY SYSTEM FOR WELL

(71) Applicant: SUMITOMO ELECTRIC INDUSTRIES, LTD., Osaka-shi, Osaka (JP)

(72) Inventors: Keiichiro Tanabe, Osaka (JP); Koma Numata, Osaka (JP); Koji Nitta, Osaka (JP); Shoichiro Sakai, Osaka (JP); Atsushi Fukunaga, Osaka (JP); Eiko Itani, Osaka (JP); Shinji Inazawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 398 days.

(21) Appl. No.: 14/081,649

(22) Filed: Nov. 15, 2013

(65) Prior Publication Data

US 2015/0137737 A1 May 21, 2015

(51) Int. Cl.
*H02J 7/00* (2006.01)
*H01M 10/36* (2010.01)
*H02J 7/32* (2006.01)
*H01M 10/054* (2010.01)
*H01M 10/0564* (2010.01)
*H01M 10/39* (2006.01)

(52) U.S. Cl.
CPC .......... *H01M 10/36* (2013.01); *H01M 10/054* (2013.01); *H01M 10/0564* (2013.01); *H01M 10/399* (2013.01); *H02J 7/32* (2013.01); *H01M 2300/0045* (2013.01); *H01M 2300/0048* (2013.01); *H02J 7/0042* (2013.01)

(58) Field of Classification Search
CPC .......... H02J 7/0042; H02J 7/32; H01M 10/60; B60L 11/1875

USPC ................. 320/101, 107, 126–127
See application file for complete search history.

(56) References Cited

U.S. PATENT DOCUMENTS

| 3,750,001 A | 7/1973 | McCloskey |
| 4,416,000 A | 11/1983 | Scherbatskoy |
| 5,113,379 A * | 5/1992 | Scherbatskoy ......... E21B 47/18 367/83 |

(Continued)

FOREIGN PATENT DOCUMENTS

| JP | H06-341285 A | 12/1994 |
| JP | H07-57179 A | 3/1995 |

(Continued)

OTHER PUBLICATIONS

Office Action mailed on Sep. 29, 2015 in a co-pending U.S. Appl. No. 14/081,632.

(Continued)

*Primary Examiner* — Paul Dinh
(74) *Attorney, Agent, or Firm* — Ditthavong & Steiner, P.C.

(57) ABSTRACT

Provided is a power supply system capable of being used in a well over a long period of time. A power supply system for a well according to the present invention includes a secondary battery having an operating temperature range including a temperature of the inside of a well and supplying power to a device installed in the well; and a charge-discharge mechanism for charging and discharging the secondary battery, and is installed in the well. The secondary battery to be used in the power supply system may be a molten salt battery, and may include a sensor and communication apparatus.

12 Claims, 18 Drawing Sheets

(56) References Cited

U.S. PATENT DOCUMENTS

| | | | |
|---|---|---|---|
| 2009/0289808 A1* | 11/2009 | Prammer | E21B 17/003 340/853.7 |
| 2010/0213942 A1 | 8/2010 | Lazarev | |
| 2010/0307773 A1* | 12/2010 | Tinnen | E21B 23/06 166/387 |
| 2010/0310907 A1 | 12/2010 | Miller et al. | |
| 2011/0081583 A1 | 4/2011 | Sugimoto et al. | |
| 2011/0151314 A1 | 6/2011 | Ogawa | |
| 2012/0058393 A1 | 3/2012 | Fukunaga et al. | |
| 2012/0100416 A1 | 4/2012 | Nitta et al. | |
| 2012/0268074 A1 | 10/2012 | Cooley et al. | |
| 2014/0170458 A1 | 6/2014 | Nitta et al. | |
| 2015/0140378 A1 | 5/2015 | Tanabe et al. | |

FOREIGN PATENT DOCUMENTS

| | | | |
|---|---|---|---|
| JP | 2007213939 A | | 8/2007 |
| JP | 2008251352 A | | 10/2008 |
| JP | 2009067644 A | | 4/2009 |
| JP | 2009067644 A2 | | 4/2009 |
| JP | 2012109194 A | | 6/2012 |
| JP | 2012134126 A | | 7/2012 |
| JP | 2012221683 A | | 11/2012 |
| WO | 2006060708 A1 | | 6/2006 |
| WO | 2011036907 A1 | | 3/2011 |
| WO | 2012162500 A2 | | 11/2012 |

OTHER PUBLICATIONS

"Molten Salt Electrolyte Battery", SEI world, vol. 402, Sumitomo Electric Industries Ltd., Mar. 2011, 4 Pages. (Concise Explanation of Relevancy Included).

Office Action mailed on Mar. 18, 2016 in a co-pending U.S. Appl. No. 14/081,632.

Japanese Office Action for related Japanese Patent Application No. 2013-006676, dated Jun. 28, 2016, 6 Pages.

Japanese Office Action for related Japanese Patent Application No. 2013-006703, dated Jun. 14, 2016, 9 Pages.

Advisory Action for related U.S. Appl. No. 14/081,632, dated Jun. 10, 2016, 9 Pages.

* cited by examiner

POWER SUPPLY SYSTEM FOR WELL

TECHNICAL FIELD

The present invention relates to a power supply system for supplying power to devices arranged in a well such as an oil well or a gas well.

BACKGROUND ART

Recently, when excavating a well such as an oil well or a gas well, a system called MWD or LWD for acquiring well information and stratum information while performing excavation has been used in order to improve efficiency of well trajectory management, reduce costs and enhance safety, etc. For example, in the MWD system, a drill string having at the lower end a bit for excavating the stratum is provided with sensors for detecting a load and a torque of the drill bit, and sensors for detecting a position, a direction and the like of a well, etc., and detected information from the sensors is transmitted to the ground using electromagnetic waves, pressure waves, acoustic pulses or the like (see, for example, Patent Literature 1). Alternatively, the drill string is drawn out from the well during a well excavation process or after completion of excavation, and measurement devices and sampling devices are inserted into the well to perform various kinds of measurements and sampling of stratum fluids (see, for example, Patent Literature 2).

CITATION LIST

Patent Literatures

Patent Literature 1: Japanese Unexamined Patent Publication No. H07-57179
Patent Literature 2: Japanese Unexamined Patent Publication No. H06-341285

SUMMARY OF INVENTION

Technical Problem

Supply of power to various kinds of sensors arranged in a well and devices such as a transmitter for transmitting detected information may be performed through cables laid from the ground. However, since the inside of the well may have a high temperature of 200° C. or higher, it is necessary to use cables having high heat resistance. Since a cable having high heat resistance is very expensive, and the greater the depth is, the longer a cable is required, there is a disadvantage in terms of costs. Supply of power to sensors etc. may be performed by a battery, but in this case, it is required that the battery not only resists a high temperature of the inside of the well but also is capable of being used over a long period of time. A thionyl chloride lithium battery having relatively high heat resistance has been heretofore used in the well in some cases. However, this battery is a primary battery and is therefore required to be replaced after a short period of time, and a drill string and so on must be drawn up for the replacement of the battery, resulting in a significant time loss, thus causing extension of construction work.

Currently, a battery capable of being used over a long period of time under a high-temperature environment in the well has not yet been put into practical use.

In view of the situation described above, an object of the present invention is to provide a power supply system capable of being used in a well over a long period of time.

Solution to Problem

A power supply system for a well according to the present invention includes a secondary battery having an operating temperature range including a temperature of the inside of a well and installed in the well to supply power to a device in the well; and a charge-discharge mechanism for charging and discharging the secondary battery.

Advantageous Effects of Invention

According to the present invention, use over a long period of time in a well becomes possible.

DESCRIPTION OF EMBODIMENTS

Figure 1:
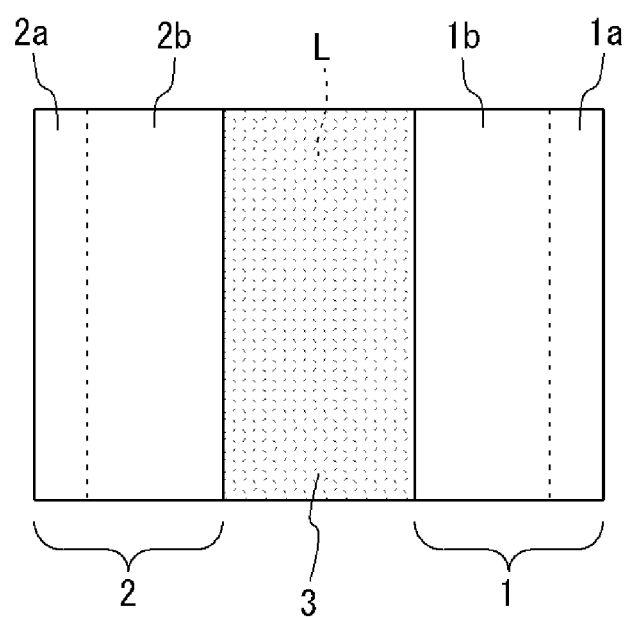
FIG. 1 is a schematic view illustrating in principle a basic structure of an electric power generation element in a molten salt battery.

Subject Matters of Embodiments of the Invention

First, subject matters of embodiments of the present invention will be listed and described. The embodiments described below can also be arbitrarily partially combined.

(1) A power supply system for a well according to an embodiment of the present invention includes a secondary battery having an operating temperature range including a temperature of the inside of a well and installed in the well to supply power to a device in the well; and a charge-discharge mechanism for charging and discharging the secondary battery.

According to this configuration, a secondary battery having an operating temperature range including a temperature of the inside of a well is used, and therefore power can be supplied to sensors etc. even under a high-temperature environment. The secondary battery can be charged by a charge-discharge mechanism, and therefore use over a long period of time can be achieved.

The power supply system according to the embodiment of the present invention can be used for supplying power to sensors etc. mounted on a drill string for excavating a well, for supplying power to sensors mounted on tube members other than the drill string (such as oil extraction tube and coiled tubing) which are inserted in the well, or for supplying power to various kinds of inspection devices inserted in the well in place of tube members such as the drill string.

(2) The secondary battery is preferably a molten salt battery.

As compared to other secondary batteries, for example a lithium ion battery etc., the molten salt battery has a high practical operating temperature range due to a high melting point of a molten salt, so that a temperature of the inside of the well can be included in the operating temperature range. Since the molten salt battery has the advantage of high energy density and incombustibility, the molten salt battery can be downsized while securing the capacity, and does not catch fire or generate a combustible gas by reacting with a substance in the well.

(3) The secondary battery preferably includes an outer package housing an electric power generation element, and a vibration controlling portion for reducing vibrations given to the outer package.

Owing to this configuration, even if vibrations associated with excavation of the well are given to the secondary battery, impacts can be suitably relieved to prevent damage.

(4) The power supply system preferably includes an energy conversion mechanism for converting kinetic energy of a fluid passing through a tube member arranged in the well into electrical energy, and supplying the electrical energy to the charge-discharge mechanism.

Owing to this configuration, charge can be performed in parallel to excavation work etc. in the well, so that the secondary battery can be used over a long period of time.

(5) The power supply system preferably includes a sensor which is operated by power supplied from the secondary battery.

By providing a power supply system equipped with the sensor as described above, detection/measurement etc. of a state in the well by the sensor can be performed over a long period of time.

(6) The power supply system preferably includes communication apparatus which is operated by power supplied from the secondary battery.

By providing a power supply system equipped with the communication apparatus as described above, communication of information detected by the sensor etc. and other information can be performed over a long period of time.

Details of Embodiments of the Invention

The embodiments of the present invention will be described in detail below with reference to the drawings.

<<Basic Structure of Molten Salt Battery>>

First, the basic structure of the molten salt battery will be described.

FIG. 1 is a schematic view illustrating in principle a basic structure of an electric power generation element in the molten salt battery. In the drawing, the electric power generation element includes a cathode (positive electrode) 1, an anode (negative electrode) 2 and a separator 3 interposed therebetween. The cathode 1 includes a cathode collector 1a and a cathode material 1b. The anode 2 includes an anode collector 2a and an anode material 2b.

A material of the cathode collector 1a is, for example, an aluminum nonwoven fabric (line diameter: 100 μm; porosity: 80%). The cathode material 1b includes a cathode active material and a binder in a kneaded form thereof. The cathode collector 1a that is an aluminum nonwoven fabric is filled with the resulting mixture, dried, and then pressed, for example, at 100 MPa to form the cathode 1 in a thickness of about 1 mm.

On the other hand, in the anode 2, an anode active material is formed in such a manner as to be deposited on the anode collector 2a made of aluminum.

The separator 3 interposed between the cathode 1 and the anode 2 is obtained by impregnating a material such as nonwoven fabric (thickness: 200 μm), which easily absorbs a liquid, with a molten salt as an electrolytic solution (electrolyte). At a temperature equal to or higher than the melting point, the molten salt is melted to contact the cathode 1 and the anode 2 in the form of an electrolytic solution L with ions dissolved therein at a high concentration. The molten salt is incombustible.

Figure 2:
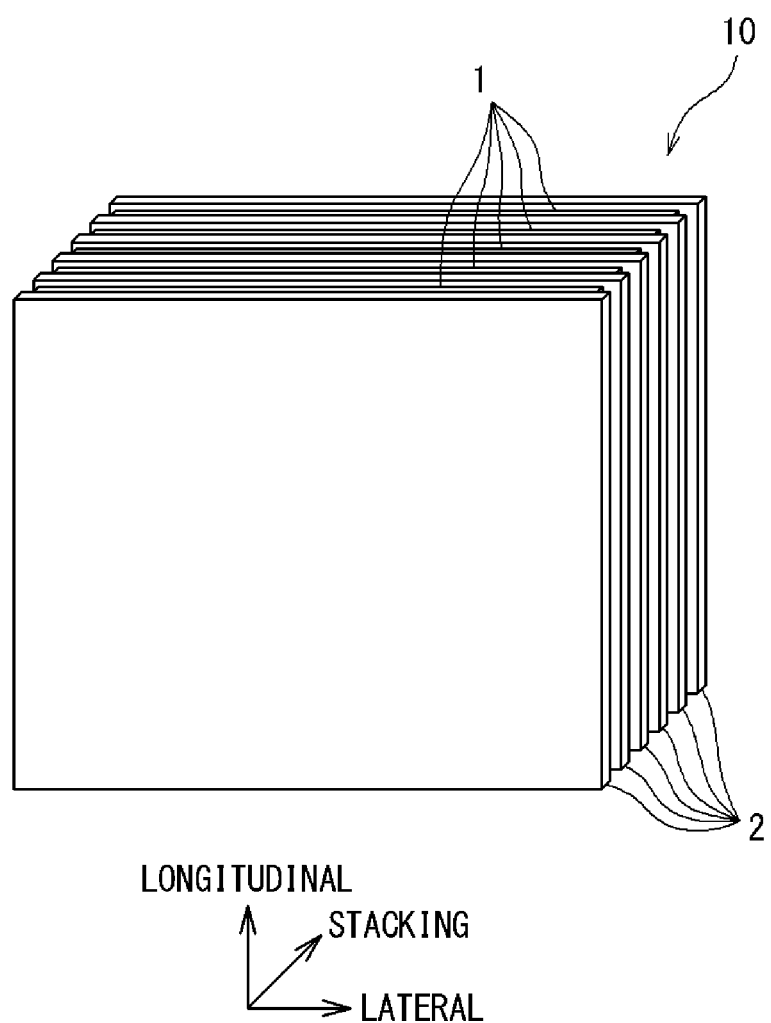
FIG. 2 is a perspective view schematically illustrating a stacked structure of a molten salt battery body (body part as a battery).

Next, a more specific configuration of the electric power generation element of the molten salt battery will be described below. FIG. 2 is a perspective view schematically illustrating a stacked structure of a molten salt battery body (body part as a battery) 10, and FIG. 3 is a lateral cross-sectional view of a similar structure.

Figure 3:
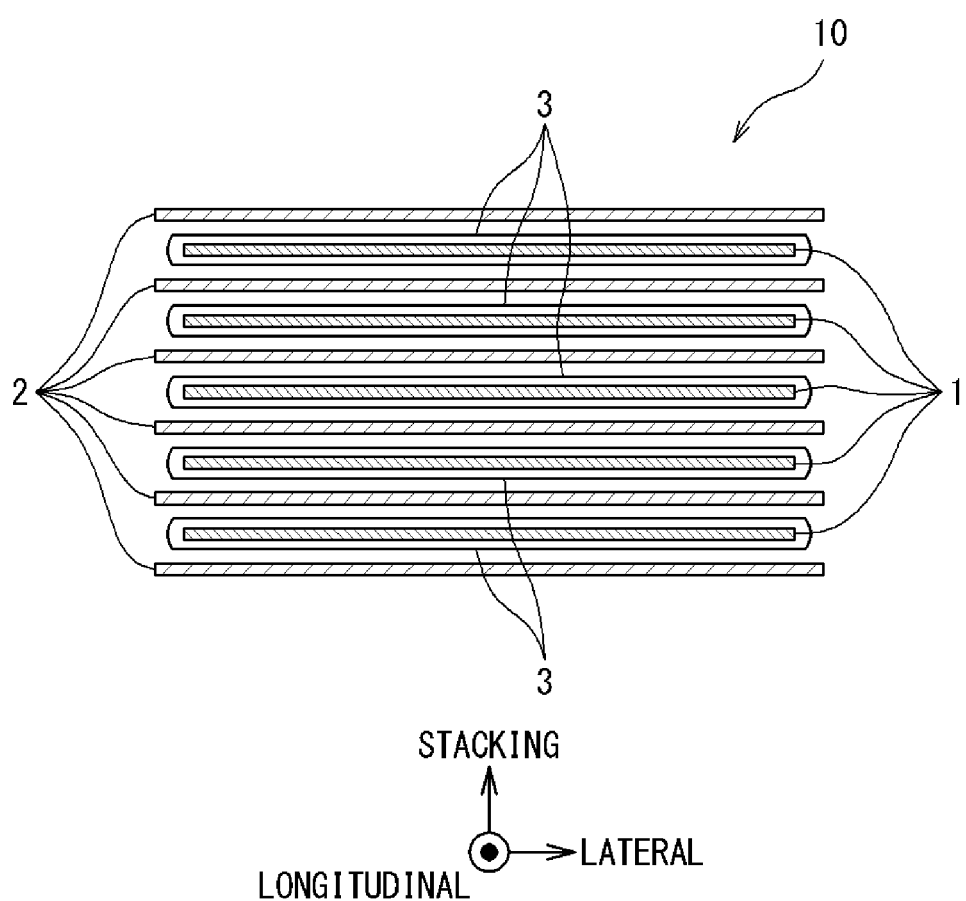
FIG. 3 is a lateral cross-sectional view of a structure similar to that in FIG. 2.

In FIGS. 2 and 3, a plurality of (6 anodes are illustrated) rectangular flat plate-shaped anodes 2, and a plurality of (5 cathodes are illustrated) rectangular flat plate-shaped cathodes 1 each stored in a bag-shaped separator 3 are superimposed on one another in a vertical direction in FIG. 3, i.e. a stacking direction, with the cathode 1 and the anode 2 facing each other, so that a stacked structure is formed.

The separator 3 is interposed between the cathode 1 and the anode 2 adjacent to each other, in other words, the cathodes 1 and the anodes 2 are alternately stacked with the separator 3 interposed between the cathode 1 and the anode 2. As the number of these components that are stacked in practice, for example, the number of cathodes 1 is 20, the number of anodes 2 is 21, and the number of separators 3 is 20 as "bags", but the number of separators 3 each interposed between the cathode 1 and the anode 2 is 40. The separator 3 is not necessarily bag-shaped, and there may be 40 separated separators.

In FIG. 3, it seems that the separator 3 and the anode 2 are separated from each other, but they are in close contact with each other at the time when the molten salt battery is completed. The cathode 1 is also in close contact with the separator 3 as a matter of course. The dimension of the cathode 1 in each of the longitudinal direction and the lateral direction is made smaller than the dimension of the anode 2 in the longitudinal direction and the lateral direction for preventing generation of a dendrite, and the outer periphery of the cathode 1 faces the circumferential edge part of the anode 2 with the separator 3 interposed therebetween.

<<One Form of Molten Salt Battery>>

The molten salt battery body 10 configured as described above is housed in, for example, an outer package (battery container) which is made of an aluminum alloy and has rectangular parallelepiped shape, and forms a unit cell, i.e. a physical single body as a battery. Hereinafter, such a unit cell as a single body is given reference sign B and described as a "molten salt battery B".

Figure 4:
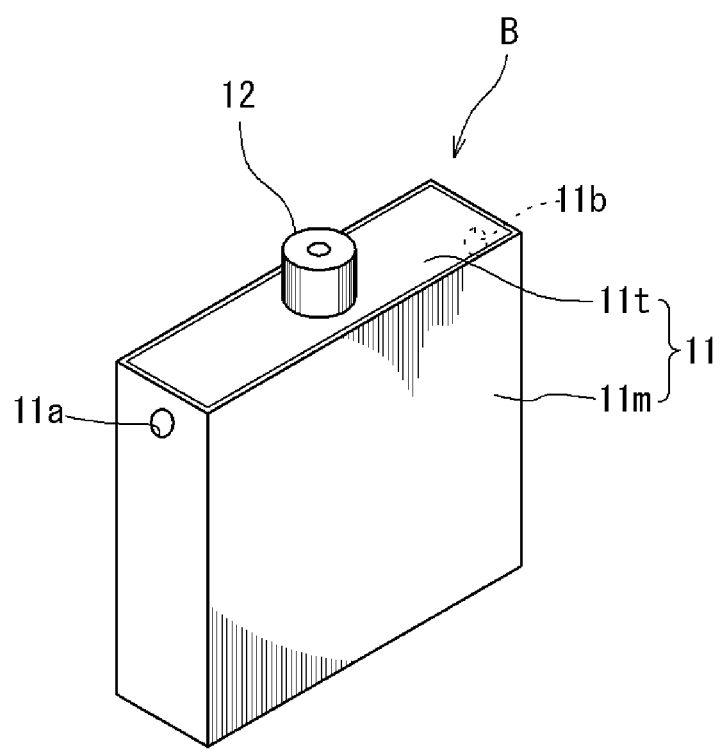
FIG. 4 is a perspective view illustrating an outline of an external appearance of a molten salt battery housed in an outer package.

FIG. 4 is a perspective view illustrating an outline of an external appearance of the molten salt battery B housed in an outer package 11. In the drawing, the outer package 11 includes a container body 11*m* excluding the upper surface of the rectangular parallelepiped, and a lid portion 11*t* mounted on the upper surface. Holes 11*a* and 11*b* for coupling and electrical connection are formed at the upper parts of both side surfaces of the outer package 11. The outer package 11 is usually provided at the upper part with a safety valve 12 for releasing pressure when the inside pressure is excessively increased. The outer package 11 is electrically insulated from the cathode 1 and the anode 2.

The single body shape of the molten salt battery B illustrated in FIG. 4 is merely an example, and the shape/dimension can be arbitrarily set according to an environment in which the battery is used, etc. In the outer package 11, a terminal for performing electrical connection may be protruded from the lid portion 11*t* etc. instead of providing the holes 11*a* and 11*b*.

The molten salt battery B described above can be used in a state of an assembled battery configured such that a plurality of batteries are gathered together and connected in series or in series/parallel for obtaining a voltage and current capacity required for a use purpose.

<<Specific Materials Associated with Operating Temperature>>

Figure 5:
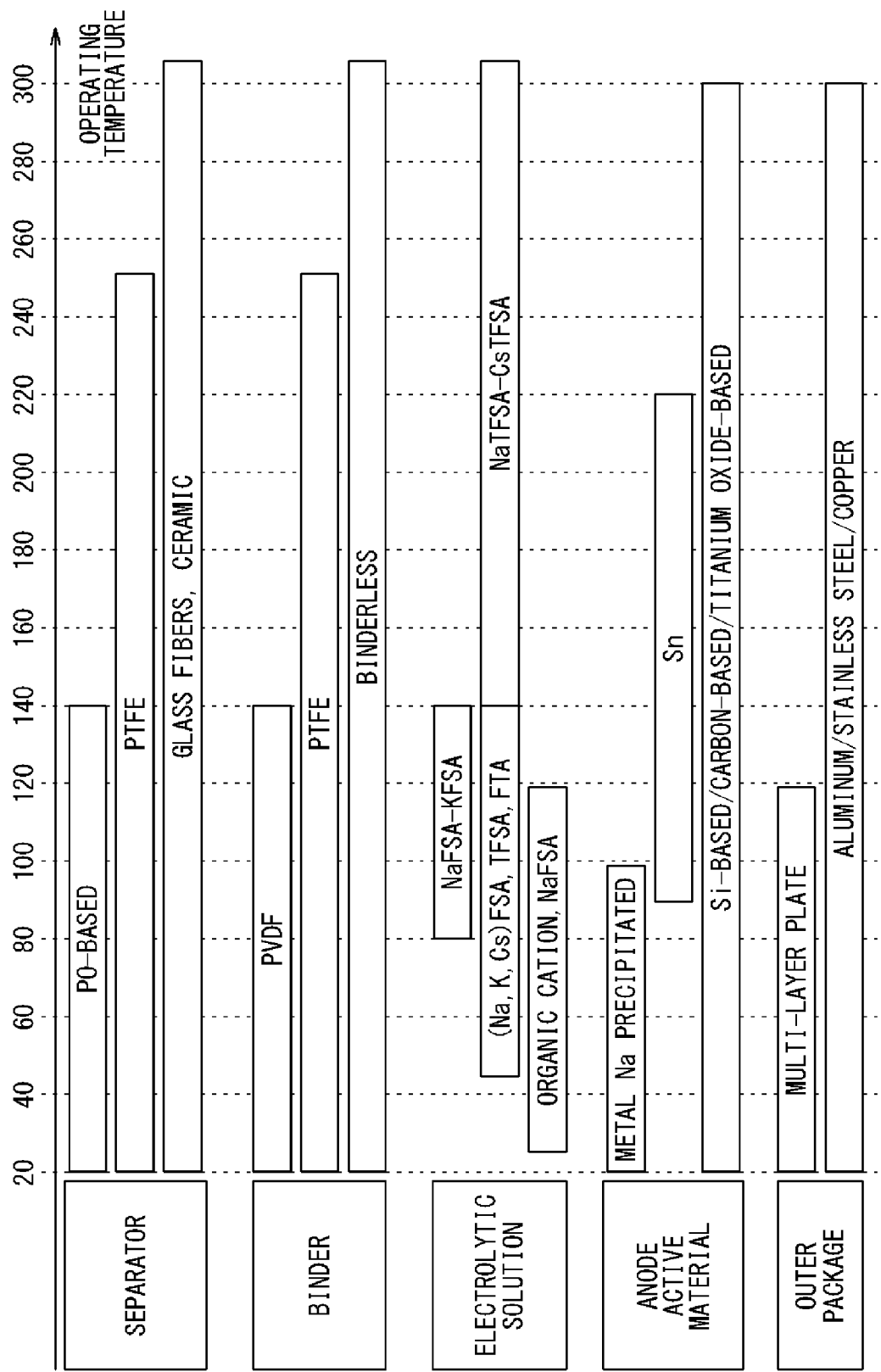
FIG. 5 is a table of results of inspecting (or predicting from known data) applicability associated with the temperature for elements other than a cathode active material (separator, binder, electrolytic solution, anode active material, and outer package).

Next, the cathode active material and the binder that form the cathode material 1*b*, the anode active material that forms the anode material 2*b*, the separator 3, the outer package 11 and the electrolytic solution L will be described for each operating temperature by showing specific examples. FIG. 5 is a table of results of inspecting (or predicting from known data) applicability associated with the temperature for elements other than a cathode active material (separator, binder, electrolytic solution, anode active material, and outer package). The abscissa represents an operating temperature [° C.].

First, for the separator, a PO (polyolefin)-based material (for example, polyethylene or polypropylene) can be used at 20° C. to 140° C. A porous body of PTFE (polytetrafluoroethylene) can be used at 20° C. to 250° C. Glass fibers or a ceramic can be used at 20° C. to a temperature higher than 300° C.

For the binder, PVDF (polyvinylidene fluoride) can be used at 20° C. to 140° C. PTFE can be used at 20° C. to 250° C. In the case of a binderless battery (no binder used), use at 20° C. to a temperature higher than 300° C. is possible. In the case of a binderless battery, a porous metal body should be used as a cathode collector.

For the electrolytic solution, one containing an organic cation and FSA (bisfluorosulfonylamide) as an anion, or NaFSA (sodium bisfluorosulfonylamide) can be used at 25° C. to 120° C. A mixture of NaFSA-KFSA (potassium bisfluorosulfonylamide) (molar ratio: 56:44) can be used at 80° C. to 140° C. The "mixture of NaFSA-KFSA" means a "mixture of NaFSA and KFSA". Hereinafter, similarly the "-" (hyphen) is used. A mixture of NaTFSA (sodium bistrifluoromethylsulfonylamide)-CsTFSA (cesium bistrifluoromethylsulfonylamide) (molar ratio: 20:80) can be used at 140° C. to a temperature higher than 300° C.

Further, a mixture of NaFSA-KFSA-CsFSA shown in FIG. 5, a mixture of NaTFSA-KTFSA-CsTFSA, a mixture of NaFTA-KFTA-CsFTA (FTA: fluorosulfonyl trifluoromethylsulfonyl amide) can be used at 45° C. to 140° C.

As the organic cation, for example, alkyl imidazole-based cations such as a 1-ethyl-3-methylimidazolium cation, alkyl pyrrolidinium-based cations such as a N-ethyl-N-methylpyrrolidinium cation, alkyl pyridinium-based cations such as a 1-methyl-pyridinium cation and quaternary ammonium-based cations such as a trimethylhexyl ammonium cation can be used.

For the anode active material, metal sodium precipitated at the anode can be used at 20° C. to about 100° C. Sn (tin) or a tin-based material containing Sn can be used at about 90° C. to 220° C. A silicon-based material (e.g. Si, ZnSi or $SiO_2$) can be used at 20° C. to 300° C. A carbon-based material (e.g. hard carbon) and a titanium oxide-based material (e.g. $Na_4Ti_5O_{12}$ or $Na_3Ti_5O_7$) can be used at 20° C. to 300° C.

For the outer package, a multi-layer plate formed by providing insulating coatings on both surfaces of an aluminum plate, a stainless steel plate or a copper plate can be used at 20° C. to about 120° C. Herein, the "plate" includes a foil. A metal plate which is not provided with an insulating coating (but insulation of the cathode/anode is secured) can be used at 20° C. to 300° C. However, a metal plate which is not provided with an insulating coating requires insulation to be secured in other structures, and therefore it may be preferred to use a multi-layer plate provided with an insulating coating where possible.

As the cathode active material, $NaCrO_2$ or $Na_{2/3}(Fe_{1/3}Mn_{2/3})O_2$ can be used at a temperature ranging from 20° C. to 300° C. although not shown in FIG. 5.

If the above-described results are divided by temperature ranges centered on the electrolytic solution, it is preferred that they are divided by three ranges of 25° C. to 120° C., 80° C. to 140° C. and 140° C. to 300° C. Then, suitable materials for these three operating temperature ranges are summarized as follows.

<<Suitable Materials for Each Operating Temperature>>

(Operating Temperature: 25° C. to 120° C.)

[Outer Package]

Multi-layer plate formed by providing an insulating coating on an aluminum plate, a stainless steel plate or a copper plate

[Cathode]
Cathode active material: $NaCrO_2$ or $Na_{2/3}(Fe_{1/3}Mn_{2/3})O_2$
Binder: PVDF or PTFE
[Anode]
Anode active material: one containing at least one of metal sodium, a tin-based material, a silicon-based material, a carbon-based material and a titanium oxide-based material
[Separator]
Polyolefin-based material, PTFE, glass fibers or ceramic
[Electrolytic Solution]
Electrolytic solution containing an organic cation and FSA as an anion, or NaFSA
(Operating Temperature: 80° C. to 140° C.)
[Outer Package]
Multi-layer plate formed by providing an insulating coating on an aluminum plate, a stainless steel plate or a copper plate
[Cathode]
Cathode active material: $NaCrO_2$ or $Na_{2/3}(Fe_{1/3}Mn_{2/3})O_2$
Binder: PVDF or PTFE
[Anode]
Anode active material: one containing at least one of metal sodium, a tin-based material, a silicon-based material, a carbon-based material and a titanium oxide-based material
[Separator]
Polyolefin-based material, PTFE, glass fibers or ceramic
[Electrolytic Solution]
Electrolytic solution containing a mixture of NaFSA-KFSA
(Operating Temperature: 140° C. to 300° C.)
[Outer Package]
Aluminum plate, stainless steel plate or copper plate
[Cathode]
Cathode active material: $NaCrO_2$ or $Na_{2/3}(Fe_{1/3}Mn_{2/3})O_2$
Binder: Binderless or PTFE
[Anode]
Anode active material: one containing at least one of a tin-based material, a silicon-based material, a carbon-based material and a titanium oxide-based material
[Separator]
PTFE, glass fibers or ceramic
[Electrolytic Solution]
Electrolytic solution containing a mixture of NaTFSA-CsTFSA Next, an example of the result of a charge-discharge test when a cathode active material, a binder, an anode active material and an electrolytic solution are selected from the above-described suitable materials is shown.

Figure 6:
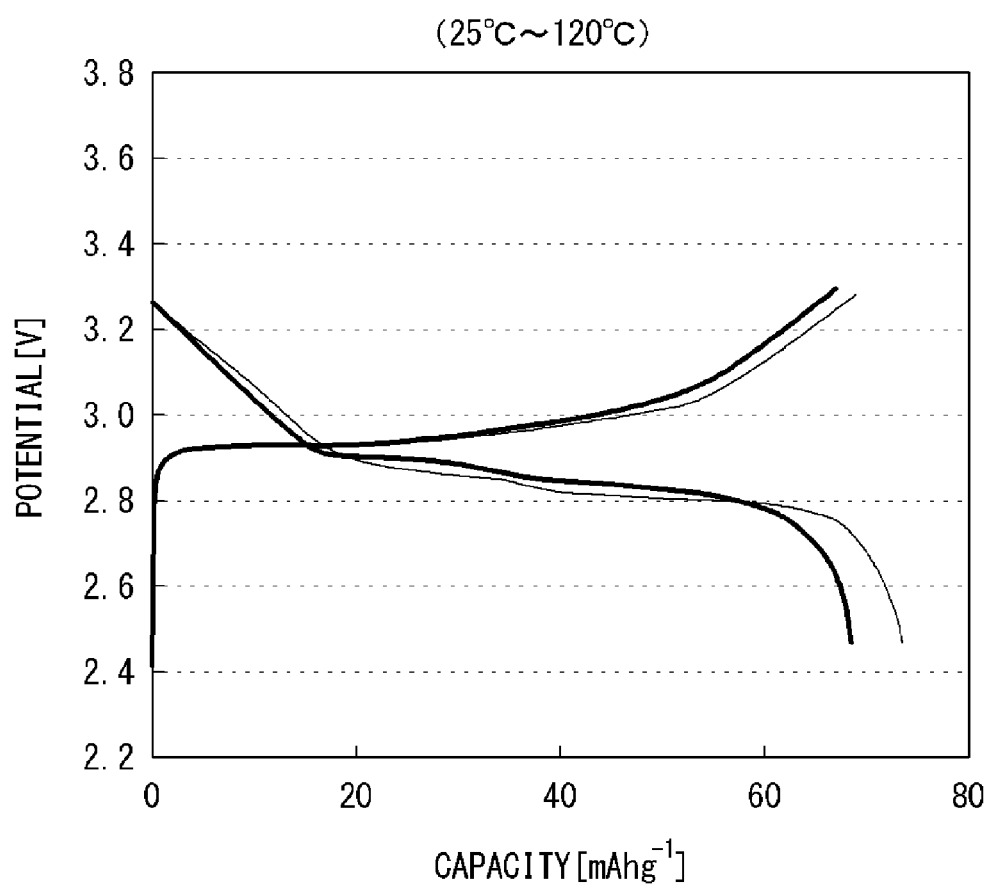
FIG. 6 is a graph illustrating a charge-discharge curve of a molten salt battery at an operating temperature of 25° C. to 120° C.

FIG. 6 is a graph illustrating a charge-discharge curve of a molten salt battery at an operating temperature of 25° C. to 120° C. As this molten salt battery, a coin cell is used as an example. The outer package portion of the coin cell is made of stainless steel and has an insulating coating of PTFE provided on the inner surface. The form of the coin cell is different from that of the above-described outer package 11, but it is considered that the result of the charge-discharge test is not significantly affected.

The cathode material is a mixture of $NaCrO_2$, Denka Black (carbon black) and PVDF in a weight ratio of 85:10:5. The anode material is a mixture of $Na_2Ti_3O_7$, Denka Black and PVDF in a weight ratio of 80:15:5. The electrolytic solution (electrolyte) is a mixture of NaFSA and Py13FSA (N-methyl-N-propylpyrrolidinium FSA) in a molar ratio of 20:80.

In FIG. 6, the thin line represents a charge-discharge curve in the second cycle, and the thick line represents a charge-discharge curve in the tenth cycle. As shown in the graph, there is no significant difference between these two charge-discharge curves. The charge-discharge curve has a proper shape because a sufficient capacity is attained with regard to charge, and the voltage is gently changed to the sufficient capacity with regard to discharge. That is, proper charge-discharge efficiency is achieved.

Figure 7:
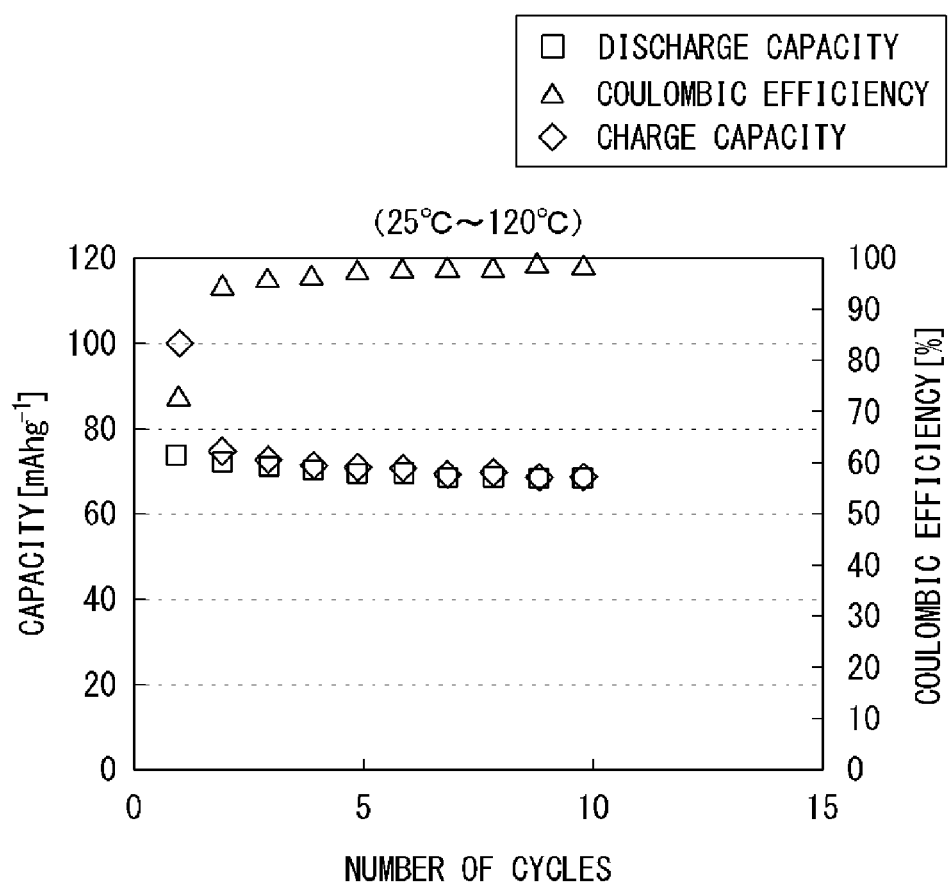
FIG. 7 is a graph illustrating cycle characteristics of a molten salt battery at an operating temperature of 25° C. to 120° C.

FIG. 7 is a graph illustrating cycle characteristics of a molten salt battery at an operating temperature of 25° C. to 120° C., and shows how the charge capacity (diamond-like square plot points), the discharge capacity (square plot points) and the Coulombic efficiency (triangular plot points) are each changed as the number of cycles increases. When attention is given to, for example, 5 to 10 cycles in the graph, stable and proper characteristics are shown in which the charge capacity, the discharge capacity and the Coulombic efficiency are all very gently changed.

Figure 8:
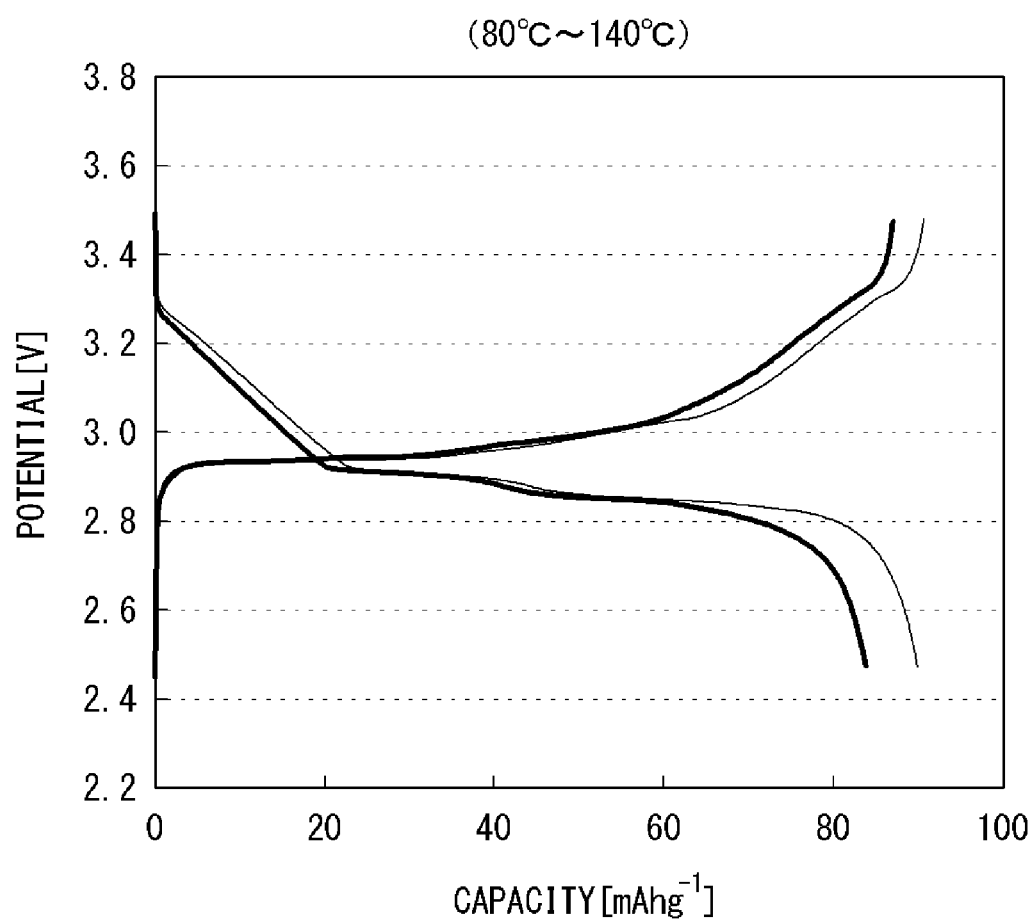
FIG. 8 is a graph illustrating a charge-discharge curve of a molten salt battery at an operating temperature of 80° C. to 140° C.

FIG. 8 is a graph illustrating a charge-discharge curve of a molten salt battery at an operating temperature of 80° C. to 140° C. As this molten salt battery, a coin cell is used as in the foregoing example.

The cathode material is a mixture of $NaCrO_2$, Denka Black and PVDF in a weight ratio of 85:10:5. The anode material is a mixture of $Na_2Ti_3O_7$, Denka Black and PVDF in a weight ratio of 80:15:5. The electrolytic solution (electrolyte) is a mixture of NaFSA and KFSA in a molar ratio of 56:44.

In FIG. 8, the thin line represents a charge-discharge curve in the second cycle, and the thick line represents a charge-discharge curve in the tenth cycle. As shown in the graph, there is no significant difference between these two charge-discharge curves. The charge-discharge curve has a proper shape because a sufficient capacity is attained with regard to charge, and the voltage is gently changed to the sufficient capacity with regard to discharge. That is, proper charge-discharge efficiency is achieved.

Figure 9:
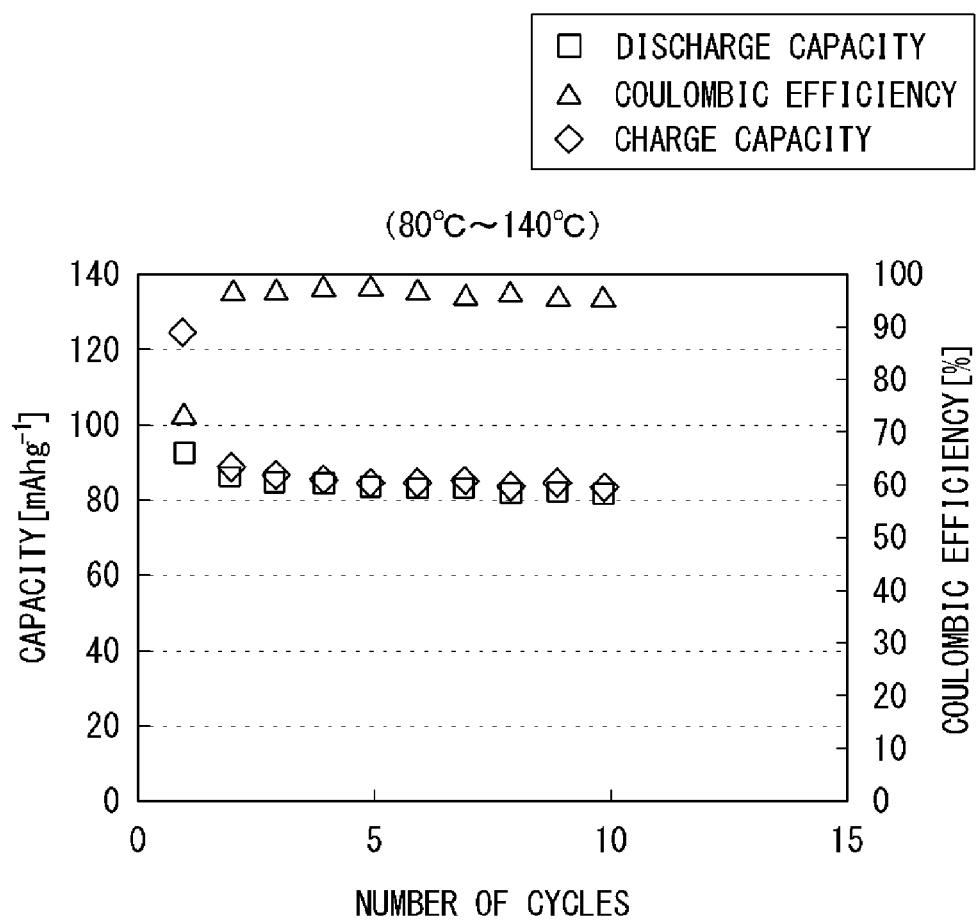
FIG. 9 is a graph illustrating cycle characteristics of a molten salt battery at an operating temperature of 80° C. to 140° C.

FIG. 9 is a graph illustrating cycle characteristics of a molten salt battery at an operating temperature of 80° C. to 140° C., and shows how the charge capacity (diamond-like square plot points), the discharge capacity (square plot points) and the Coulombic efficiency (triangular plot points) are each changed as the number of cycles increases. When attention is given to, for example, 5 to 10 cycles in the graph, stable and proper characteristics are shown in which the charge capacity, the discharge capacity and the Coulombic efficiency are all very gently changed.

Figure 10:
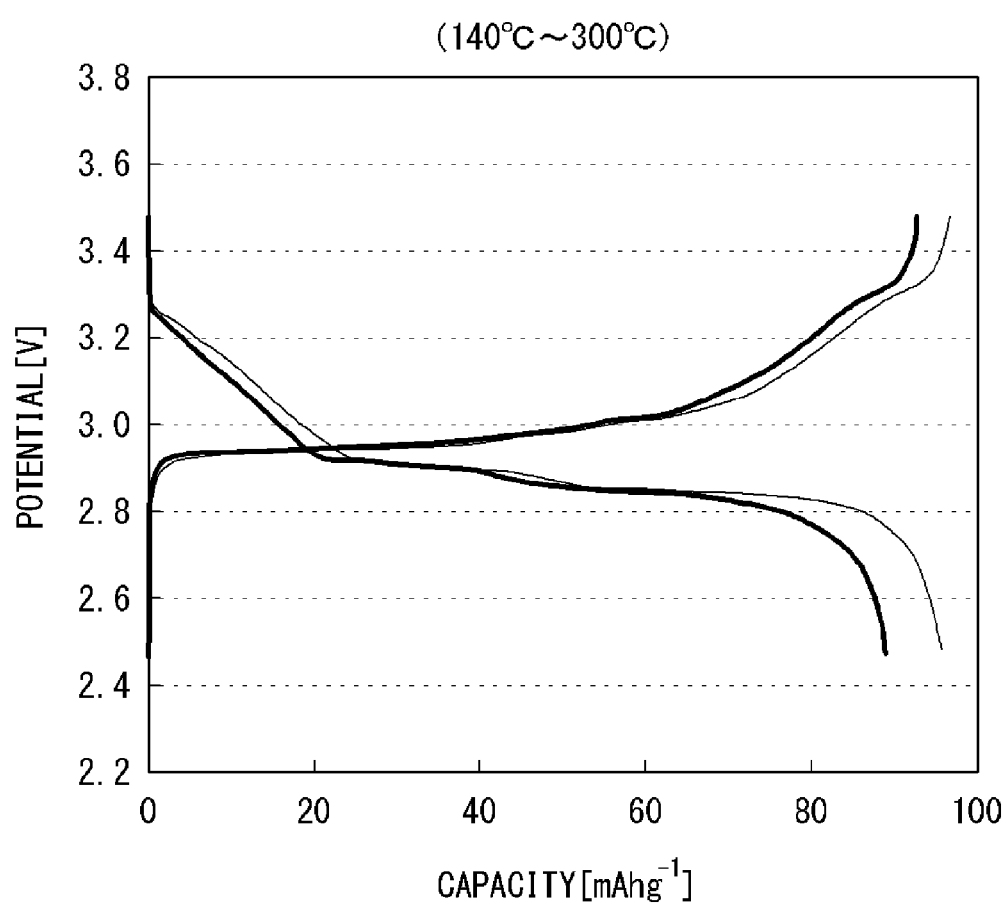
FIG. 10 is a graph illustrating a charge-discharge curve of a molten salt battery at an operating temperature of 140° C. to 300° C.

FIG. 10 is a graph illustrating a charge-discharge curve of a molten salt battery at an operating temperature of 140° C. to 300° C. As this molten salt battery, a coin cell is used as in the foregoing example.

The cathode material is a mixture of $NaCrO_2$, acetylene black and PTFE in a weight ratio of 85:10:5. As the anode material, hard carbon is used. The electrolytic solution (electrolyte) is a mixture of NaTFSA and Py13TFSA (N-methyl-N-propylpyrrolidinium TFSA) in a molar ratio of 10:90.

In FIG. 10, the thin line represents a charge-discharge curve in the second cycle, and the thick line represents a charge-discharge curve in the tenth cycle. As illustrated in the graph, there is no significant difference between these two charge-discharge curves. The charge-discharge curve has a proper shape because a sufficient capacity is attained with regard to charge, and the voltage is gently changed to the sufficient capacity with regard to discharge. That is, proper charge-discharge efficiency is achieved.

Figure 11:
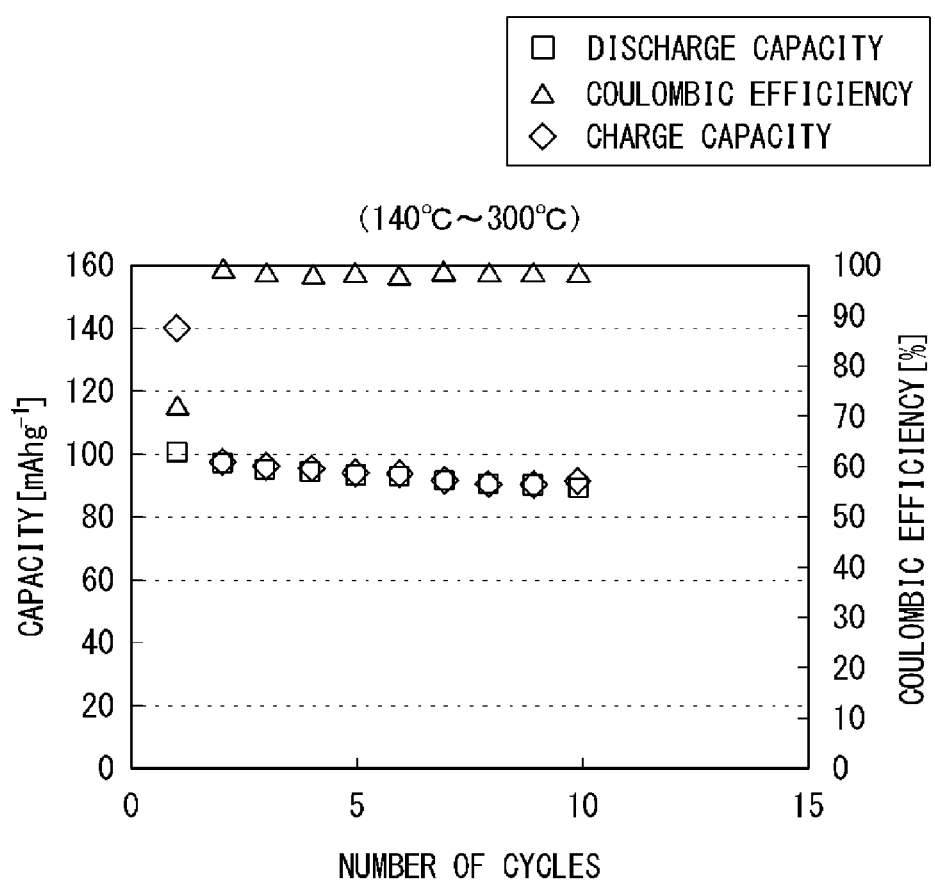
FIG. 11 is a graph illustrating cycle characteristics of a molten salt battery at an operating temperature of 140° C. to 300° C.

FIG. 11 is a graph illustrating cycle characteristics of a molten salt battery at an operating temperature of 140° C. to 300° C., and shows how the charge capacity (diamond-like square plot points), the discharge capacity (square plot points) and the Coulombic efficiency (triangular plot points) are each changed as the number of cycles increases. When attention is given to, for example, 5 to 10 cycles in the graph, stable and proper characteristics are shown in which the charge capacity, the discharge capacity and the Coulombic efficiency are all very gently changed.

By selecting suitable materials for three operating temperature ranges as described above, there can be provided a molten salt battery excellent in performance as a battery (charge-discharge efficiency and cycle characteristics) over a wide temperature range of 25° C. to 300° C.

The example is illustrative, but it is considered that by selecting any materials from the above-described suitable materials for each operating temperature range, a similar result can be obtained.

<<Configuration of Molten Salt Battery Having Vibration Controlling Portion>>

The molten salt battery according to the present invention (molten salt battery (secondary battery) described in claims) includes one or more molten salt batteries B described above and a vibration controlling portion 30 described below. The vibration controlling portion 30 reduces vibrations transmitted into the outer package 11 of the molten salt battery B, thereby preventing damage and the like of the molten salt battery B to enhance durability. In the foregoing descriptions, a unit cell in which the molten salt battery body 10 (electric power generation element) is housed in the outer package 11 is referred to as the "molten salt battery B", but in the descriptions below, in addition thereto, a molten salt battery including the molten salt battery B and the vibration controlling portion 30 is given reference sign 100 and referred to as a "molten salt battery 100" (or a "molten salt assembled battery 100").

Figure 12:
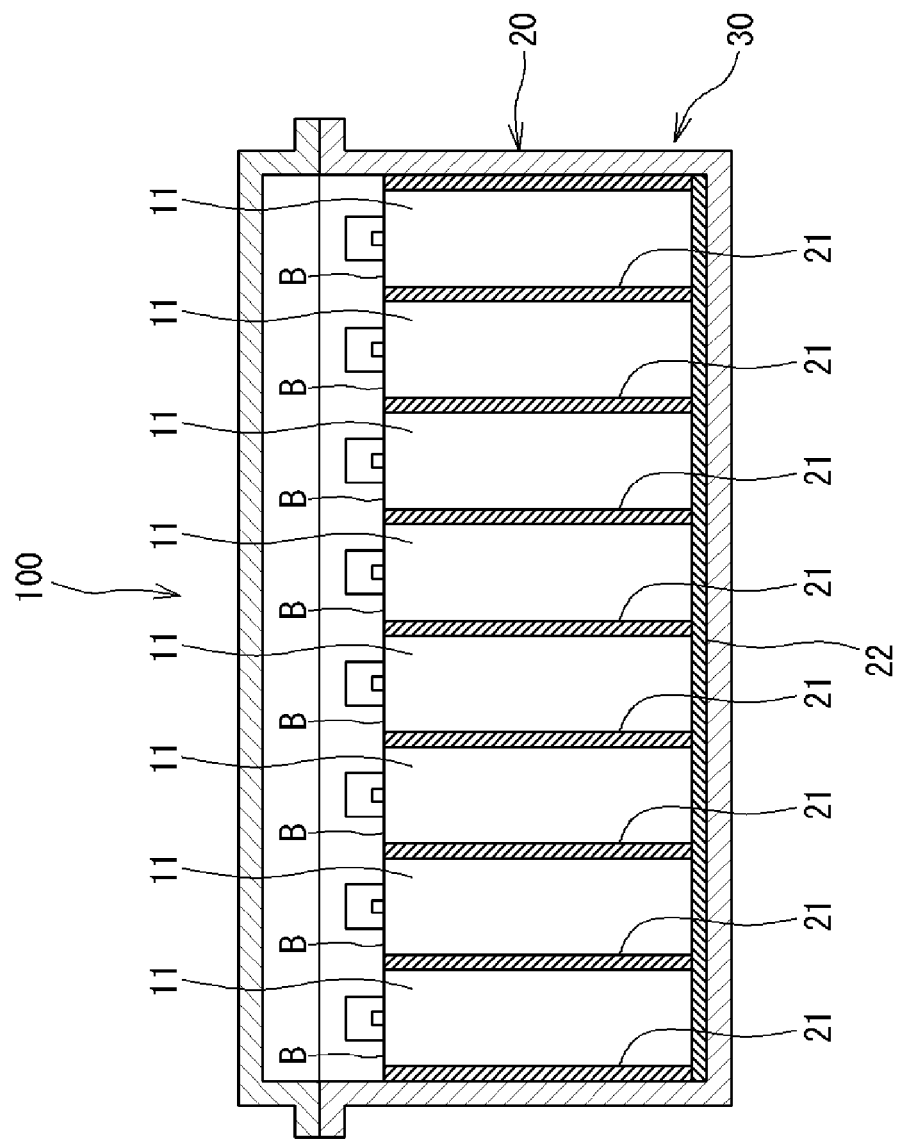
FIG. 12 is a cross-sectional view illustrating a configuration of a molten salt battery including a vibration controlling portion according to one embodiment of the present invention.

FIG. 12 is a cross-sectional view illustrating a configuration of the molten salt battery 100 including the vibration controlling portion 30 according to one embodiment of the present invention. The molten salt battery 100 of this embodiment is configured as the molten salt assembled battery 100 in which a plurality of molten salt batteries B described above are housed in a case 20. The molten salt assembled battery 100 includes a plurality of molten salt batteries B, the case 20 with a lid, which houses the molten salt batteries B, and vibration controlling members (vibration controlling means) 21 and 22 provided between the molten salt batteries B and the inner surface (including the bottom surface) of the case 20 and between adjacent molten salt batteries B. The vibration controlling members 21 and 22 are composed of an elastic material having elasticity and slight viscosity, such as a silicone rubber or a fluororubber, and are formed from a material having such heat resistance that degeneration or performance deterioration does not occur at least at the above-described operating temperatures of the molten salt battery B.

The vibration controlling members 21 and 22 exhibit a vibration controlling effect of absorbing, within the case 20, vibrations given to the molten salt assembled battery 100 from outside, so that impacts on the molten salt batteries B are relieved. Therefore, it is possible to cope with use under an environment where strong vibrations are generated. Here, the case 20 and the vibration controlling members 21 and 22 constitute the vibration controlling portion 30 for reducing vibrations given to the molten salt battery B. Examples of use of the molten salt battery B under an environment where strong vibrations are generated include application to a well excavator as described later. In this case, the molten salt battery B can resist vibrations of 1 G or more, preferably 6 G or more, more preferably even 12 G.

In this embodiment, vibration resistance performance of the whole molten salt assembled battery 100 is enhanced, and therefore vibration resistance performance required for individual molten salt batteries B (e.g. material strength of the outer package 11, bonding strength, strength of the separator 3, etc.) can be reduced, thus making it possible to reduce costs.

The vibration controlling members 21 and 22 do not have to be provided everywhere between adjacent molten salt batteries B or between the inner surface of the case 20 and the molten salt batteries B, but may be provided at locations where the vibration controlling members are required to obtain a necessary vibration controlling effect. In the case 20, one (single) molten salt battery B may be housed rather than a plurality of molten salt batteries B. In this case, the vibration controlling members 21 and 22 may be provided between the inner surface of the case 20 and the molten salt battery B.

Figure 13:
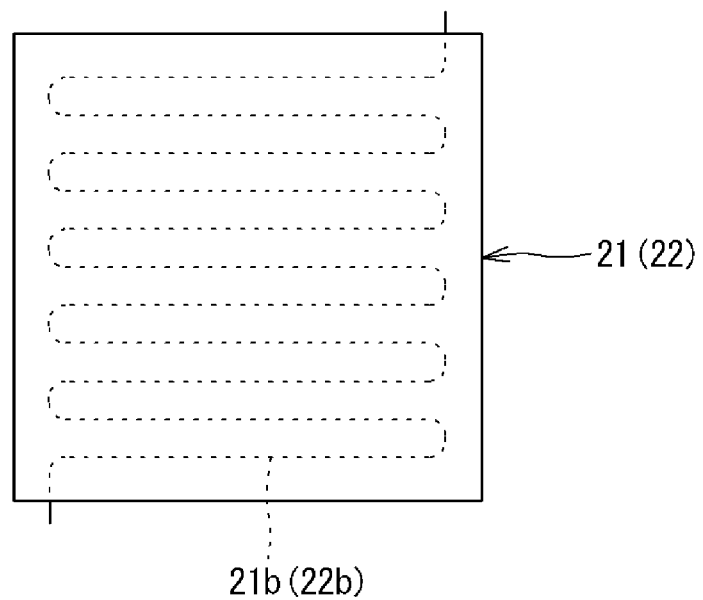
FIG. 13 is a drawing illustrating only a vibration controlling member as an example.

The vibration controlling members 21 and 22 may be configured as a rubber heater. In this case, by embedding a heat generator 21b (22b) in the vibration controlling member 21 (22) as illustrated in FIG. 13 and passing a current through the heat generator 21b (22b), the outer packages 11 of the molten salt batteries B can be heated through the vibration controlling member 21 (22) to melt the electrolytes of the molten salt batteries B. In this case, the vibration controlling member 21 (22) has not only a function of relieving impacts on the molten salt batteries B, but also a function as a heat conductor to conduct heat of the heat generator 21b (22b) to the molten salt batteries B. Since the vibration controlling member 21 (22) is configured as described above, the molten salt assembled battery 100 can be suitably used even when a predetermined operating temperature is not attained. In the present invention, the heat generator 21b (22b) is not necessarily required, and it is desirable that the heat generator 21b (22b) be omitted particularly under an environment where it is difficult to pass a current through the heat generator 21b (22b).

Figure 14:
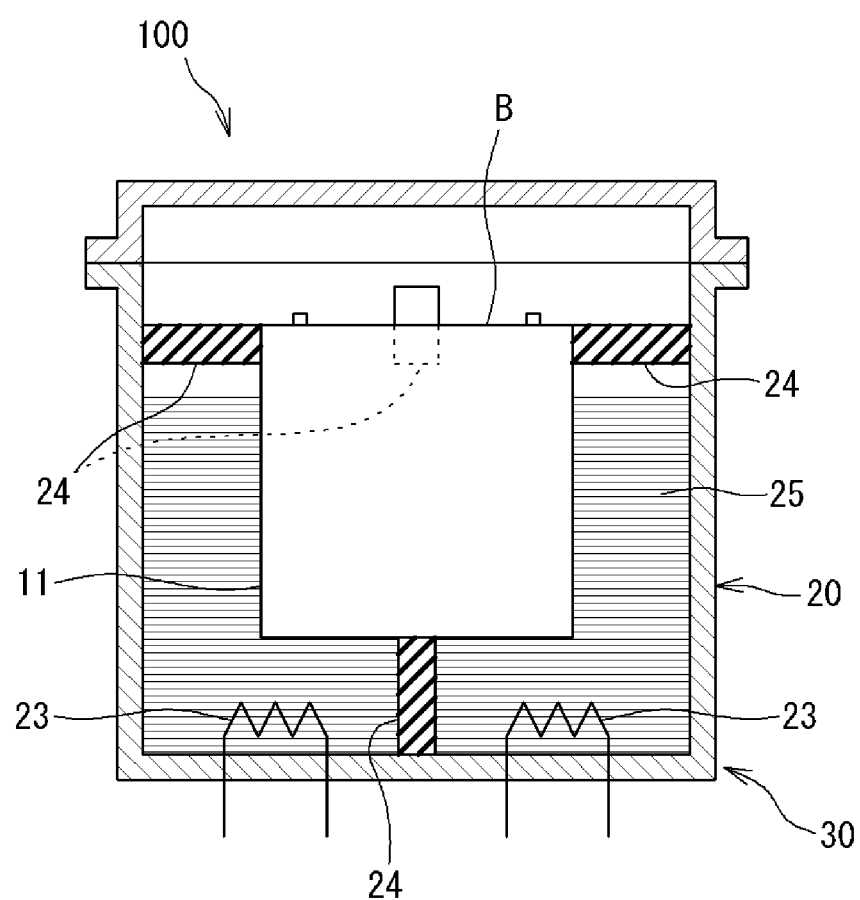
FIG. 14 is a cross-sectional view illustrating a configuration of a molten salt battery including a vibration controlling portion according to another embodiment of the present invention.

FIG. 14 is a cross-sectional view illustrating a configuration of the molten salt battery 100 including the vibration controlling portion 30 according to another embodiment. In the drawing, the molten salt battery B exists alone in the case 20, or a plurality of molten salt batteries B are arranged in a direction perpendicular to the paper surface of the drawing to form the molten salt assembled battery 100.

When a plurality of molten salt batteries B are arranged, the vibration controlling members 21 and 22 as in the above-described embodiment are not held between adjacent molten salt batteries B, and the outer packages 11 may be brought into close contact with each other, or there may be a slight gap therebetween. A plurality of molten salt batteries B are supported by support members (vibration controlling means) 24 fixed so as to protrude from the inner surface (front surface, back surface, both left and right side surfaces and bottom surface) of the case 20. The support member 24 is composed of an elastic material such as a silicone rubber or a fluororubber like the above-described vibration controlling members 21 and 22, and has excellent elasticity for absorption of vibrations and impacts. In place of a rubber, for example, a coil spring can be used.

The case 20 is filled with an oil (vibration controlling means) 25 to such a level that the upper part of the molten salt battery B is not immersed in the oil 25. As the oil 25, a silicone oil or a fluorine-based oil is suitable, and one having sufficient viscosity, rather than fluent liquid quality, is suitable. Buoyancy of the oil 25 reduces a load applied to the support member 24 at the bottom surface. The support members 24 at the front surface, the back surface and both left and right side surfaces support the molten salt battery only to the extent that the posture of the outer package 11 is kept upright, and are therefore under a small load as compared to the support member 24 at the bottom surface.

In the molten salt assembled battery 100 illustrated in FIG. 14, the oil 25, in cooperation with the support member 24, exhibits an effect of relieving impacts on the outer package 11 and overall vibrations due to liquid viscosity of the oil. Therefore, vibration resistance performance of the molten salt assembled battery 100 can be enhanced. Since an area of the support member 24, which is in contact with the outer package 11, is relatively small, vibrations of the case 20 can be made hard to be transmitted to the outer package 11. In this embodiment, principally the oil 25 functions as the vibration controlling portion 30, and the vibration controlling member 21 assists the vibration controlling function of the oil 25.

In this embodiment, a heater 23 may be provided in the lower part in the case 20. When a current is passed through the heater 23, the oil 25 is heated, and the heated oil 25 serves as a heating medium to heat the outer packages 11, so that the electrolytes of the molten salt batteries B can be melted.

Figure 15:
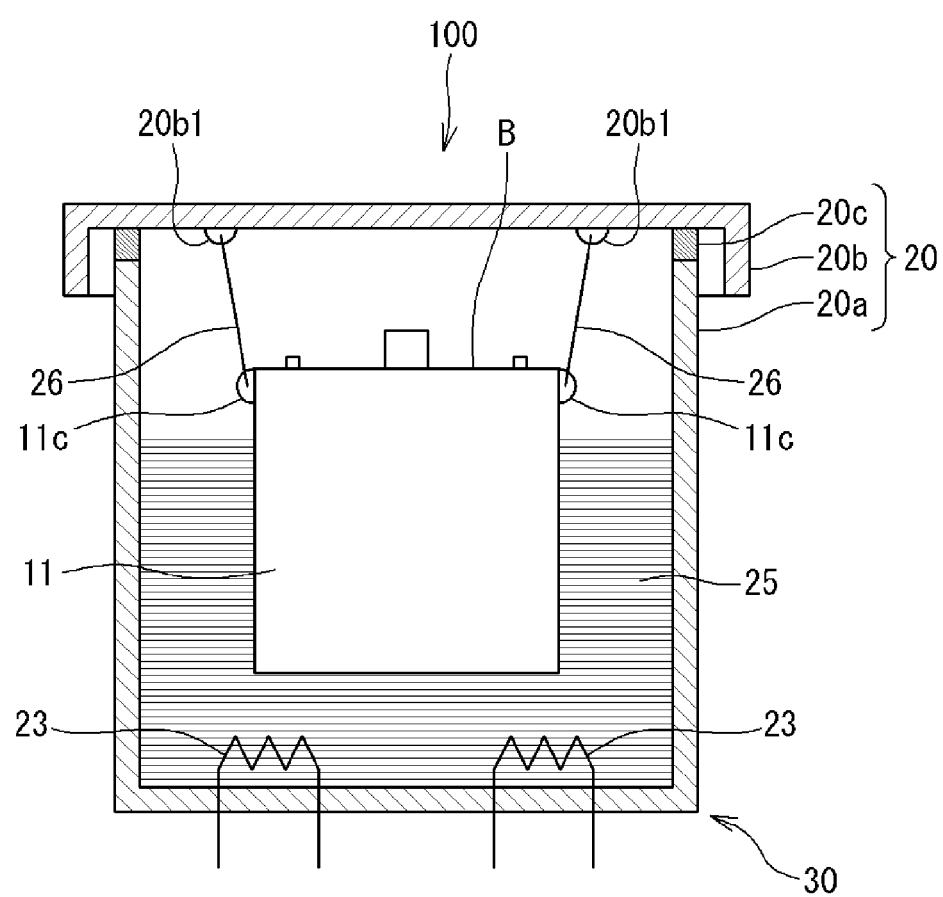
FIG. 15 is a cross-sectional view illustrating a configuration of a molten salt battery including a vibration controlling portion according to still another embodiment of the present invention.

FIG. 15 is a cross-sectional view of the molten salt battery 100 having the vibration controlling portion 30 according to still another embodiment.

This embodiment is different from the above-described embodiment in the form of the case 20 and the support structure of the molten salt battery B to the case 20. Otherwise this embodiment is the same as the second embodiment, the same reference signs are given, and detailed descriptions are omitted.

In FIG. 15, the case 20 includes a body portion 20a, a lid 20b, and a seal portion 20c attached to the upper end of the body portion 20a. The material of the seal portion 20c is, for example, a rubber or a nylon-based resin, and the seal portion 20c should have such a level of sealing that the oil 25 does not easily leak out. Support pieces 11c for suspension are provided at left and right upper ends of the molten salt battery B, and support pieces 20b1 are provided on the inside back surface of the lid 20b. A wire 26 (a chain or the like is also possible) is hung between each support piece 11c and each support piece 20b1 to suspend the molten salt battery B from the lid 20b. When a plurality of molten salt batteries B are arranged in a direction perpendicular to the paper surface of FIG. 8, all the molten salt batteries B are suspended in the same manner. However, all the plurality of molten salt batteries B can also be suspended collectively.

Since the outer package 11 is not fixed to but suspended from the case 20 (lid 20b), vibrations of the case 20 are hard to be transmitted directly to the outer package 11, and vibrations of the outer package 11 are relieved due to viscosity of the oil 25. As described above, in this embodiment, the oil 25 principally has a function as the vibration controlling portion 30, and the suspension structure assists the function as the vibration controlling portion 30.

Figure 16:
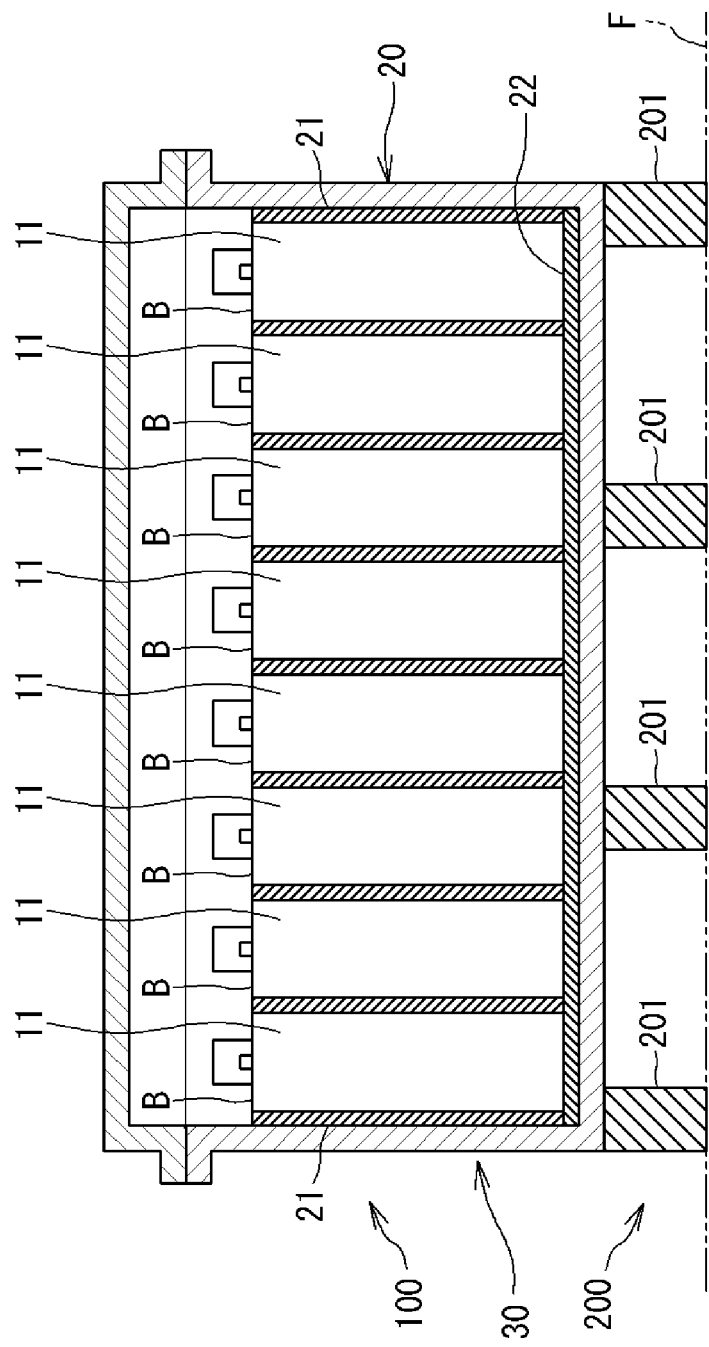
FIG. 16 is a cross-sectional view illustrating a configuration of a molten salt battery including a vibration controlling portion according to still another embodiment of the present invention.

FIG. 16 is a cross-sectional view of a molten salt battery having the vibration controlling portion 30 according to still another embodiment. In this embodiment, a further vibration controlling mechanism 200 is added to the molten salt assembled battery 100 illustrated in, for example, FIG. 12. The vibration controlling mechanism 200 includes a plurality of antivibration rubbers 201 provided between the case 20 and the floor surface (installation surface) F (it may be some fixing board). The antivibration rubber 201 acts like a seismic isolation rubber which is generally applied to a seismic isolation structure in a building, so that impacts and vibrations transmitted from the floor surface F to the case 20 can be significantly reduced.

<<Use Mode of Molten Salt Battery 100>>

Next, one use mode of the molten salt battery having the vibration controlling portion 30 as described above will be described.

Figure 17:
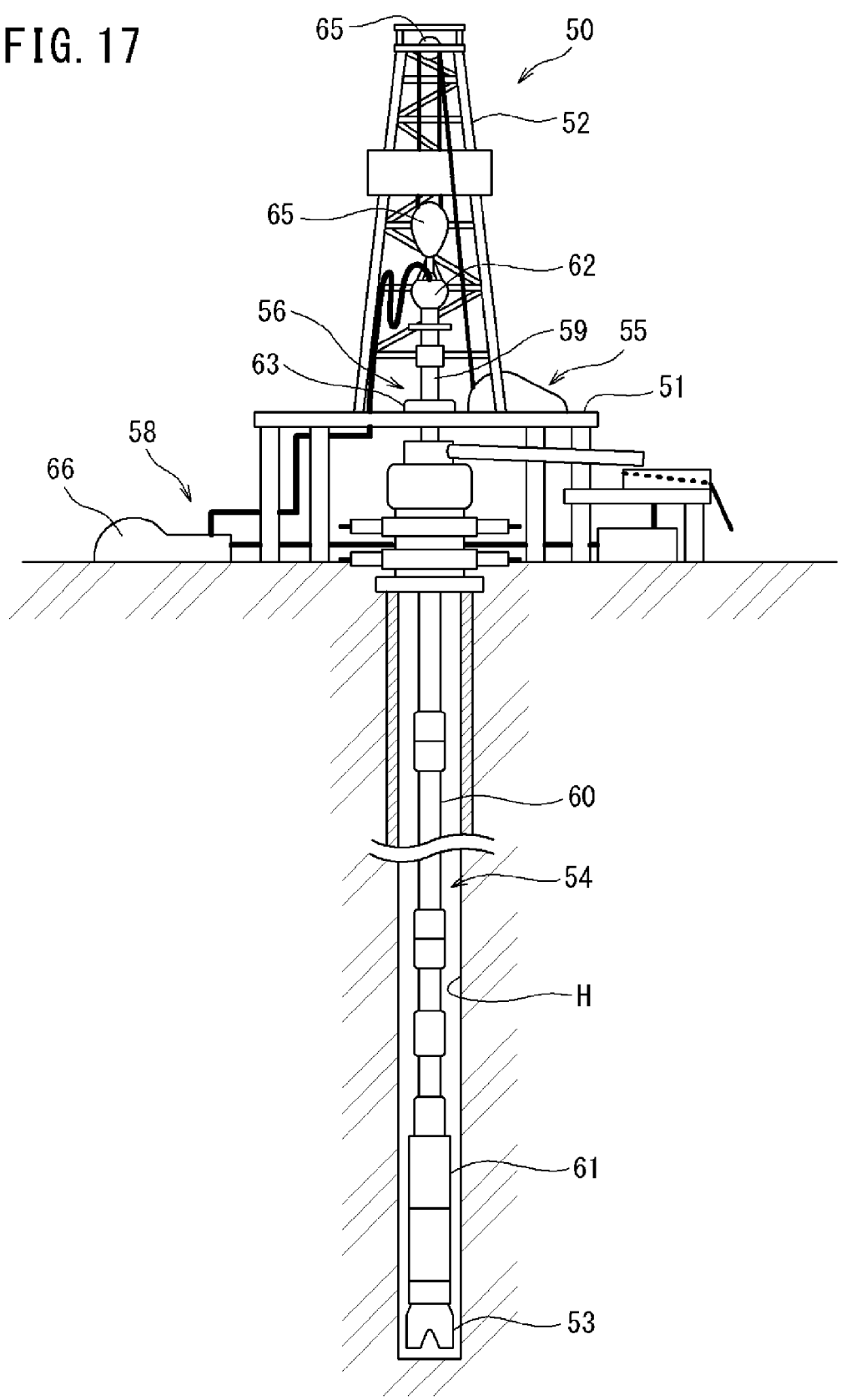
FIG. 17 is a schematic front view illustrating a well excavator to which a molten salt battery can be applied.

FIG. 17 is a schematic front view illustrating a well excavator 50 to which the molten salt battery 100 can be applied.

The well excavator 50 of this embodiment excavates a hole (well) under the ground for the purpose of extraction of underground resources or engineering works, and is particularly a rotary excavator which efficiently excavates a well of great depth to the existence stratum of underground fluid resources such as petroleum, natural gas or geothermal steam for extracting the resources.

The rotary excavator 50 includes a tower 52 built on a floor 51 installed on the land, a drill string (excavation tube) 54 supported in a suspended state by the tower 52 and provided at the lead end with a bit (excavation tool) 53 for crushing rock, a hoisting device 55 for elevating and lowering the drill string 54 in the vertical direction, a rotating device 56 for rotating the drill string 54, and a muddy water supplying device 58 for supplying muddy water as an excavation fluid into a well H.

The drill string 54 is composed of a series of pipes, and includes a kelly 59, a drill pipe 60 and a drill collar 61 in the descending order. The bit 53 is provided at the lower end of the drill collar 61.

The rotating device 56 includes a rotary joint 62 connected to the upper end of the drill string 54, and a rotating table 63 provided on the floor 51 to rotate the kelly 59 of the drill string 54 about the axial center in the vertical direction by a motor (not illustrated). Rotation of the drill string 54 causes the bit 53 to dig through the stratum.

The hoisting device 55 can elevate and lower the drill string 54 using a pulley 65 to adjust a load given to a bottom hole from the bit 53 at the lower end of the drill string 54.

The muddy water supplying device 58 delivers muddy water from a muddy water pump 66, causes the muddy water to flow into the drill string 54 through the rotary joint 62, and jets the muddy water to the bottom hole from the bit 53. The muddy water jetted from the bit 53 is caused to pass through a ring gap between the outside of the drill string 54 and the well H and return to the ground. In this way, cuttings crushed by the bit 53 can be discharged to the ground, while ingress of stratum fluids is prevented by controlling the pressure of the inside of the well H, friction of the drill string 54 is reduced, devices in the well are cooled, and so on.

Figure 18:
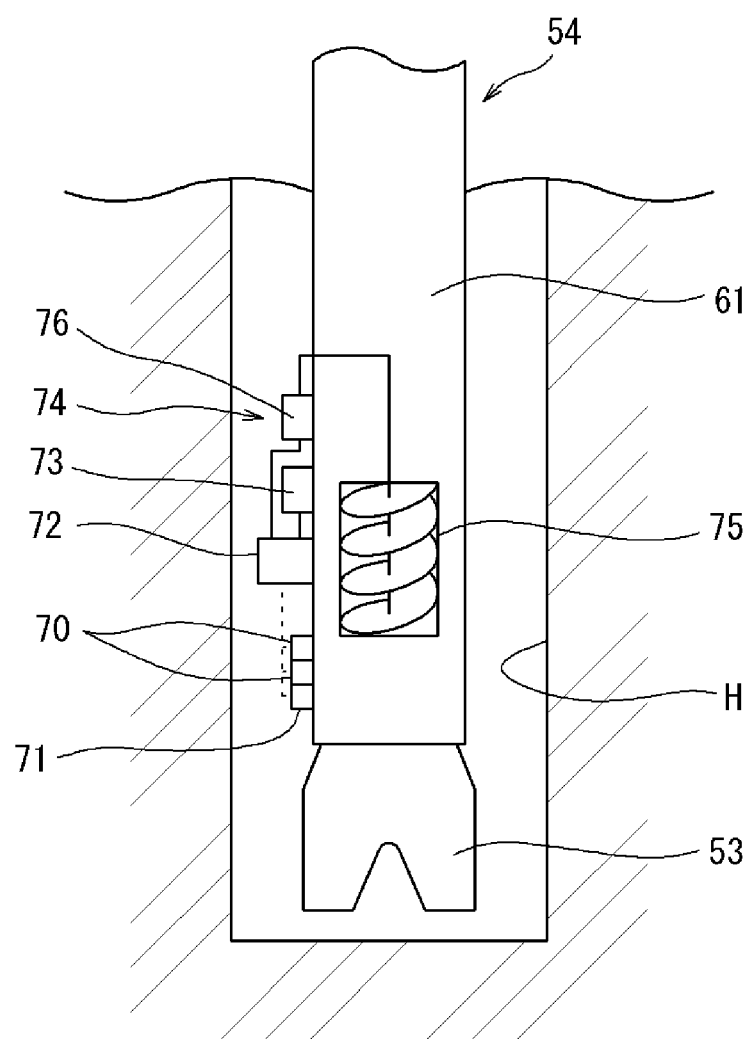
FIG. 18 is an explanatory view schematically illustrating a lead end side (lower end side) of a drill string of the well excavator.

FIG. 18 is an explanatory view schematically illustrating the lead end side (lower end side) of the drill string 54. The drill collar 61 is provided in the lower part of the drill string 54, and the bit 53 is attached to the lower end of the drill collar 61. The drill collar 61 includes a sensor 70 for detecting a state of the vicinity of the bottom hole, a transmitter-receiver (communication apparatus) 71 for transmitting and receiving detected information etc. of the sensor 70, a secondary battery 73 for storing electrical energy to be supplied to the sensor 70 and the transmitter-receiver 71, a charge-discharge mechanism 72 for charging and discharging the secondary battery 73, and an energy conversion (generation) mechanism 74 for supplying electrical energy to the charge-discharge mechanism 72. The sensor 70, the transmitter-receiver 71, the charge-discharge mechanism 72, the energy conversion mechanism 74 and the secondary battery 73 constitute a power supply system with the secondary battery 73 as a power supply.

The sensor 70 includes at least one of various kinds of sensors such as, for example, a sensor for measuring the temperature and pressure of the vicinity of the bottom hole, a sensor for measuring the direction, gradient, etc. of the well, a sensor for measuring the vibration, load, torque, etc. of the bit 53, a sensor for measuring stratum evaluation information (stratum gamma rays, stratum specific resistance, etc.), and a sensor for measuring the viscosity, pressure, etc. of fluids (excavation fluid, stratum fluid (oil/gas), etc.) flowing through the inside or the outside of the drill collar 61.

The transmitter-receiver 71 performs communication of information with a transmitter-receiver (not illustrated) installed on the ground, and is used, for example, for transmitting information detected by the above-described various kinds of sensors 70 and receiving various kinds of information (control information etc.) from the transmitter-receiver on the ground.

For the transmitter-receiver 71, the following systems are employed: a mud pulse system in which a pressure wave corresponding to information to be transmitted is generated in muddy water and propagated through the inside of the drill string 54; and an electromagnetic wave system in which information is transmitted and received through an electromagnetic wave.

Various kinds of sensors 70 and the transmitter-receiver 71 are operated by power supplied from the secondary battery 73. The secondary battery 73 is charged and discharged by the charge-discharge mechanism 72.

The charge-discharge mechanism 72 includes a charge-discharge circuit which performs control of the current and the voltage, management of the charge-discharge time, direct current-alternating current conversion, etc. for achieving a discharge function of supplying electrical energy (charges) stored in the secondary battery to devices such as the sensor 70 and the transmitter-receiver 71 and a charge function of storing electrical energy supplied from the energy conversion mechanism 74 in the secondary battery 73.

The energy conversion mechanism 74 includes a screw 75 rotatably supported in the drill collar 61, and a generator (electric power generator) 76 for converting rotating power (kinetic energy) of the screw 75 into electrical energy. The screw 75 is rotated by the flow of fluids flowing through the drill collar 61, for example, muddy water as an excavation fluid or fluids in the stratum (oil and gas), and the generator 76 is operated by the rotating power thereof to generate power, so that the secondary battery 73 can be charged through the charge-discharge mechanism 72.

Electrical devices such as the sensor 70 and the transmitter-receiver 71 may be configured to be supplied with electrical energy not only from the secondary battery 73 but also directly from the energy conversion mechanism 74 as necessary.

For the secondary battery 73 provided in the drill collar 61 of the excavator 50, the molten salt battery 100 (or B) described previously is used.

The secondary battery 73 to be used for the excavator 50 should resist a temperature of about 165° C. to 200° C., i.e. an environmental temperature during excavation. The molten salt battery 100 of the present invention can be used over a wide operating temperature range as described previously, and can be suitably applied to the drill string 54 of the excavator 50 because the highest operating temperature range is set to 140° C. to 300° C. The secondary battery 73 to be used for the excavator 50 is required to be capable of being used continuously for at least several weeks (e.g. 2 to 6 weeks). The molten salt battery 100 of the present invention has small self discharge even under a high-temperature environment, and can be charged by the charge-discharge mechanism 72, so that the requirement of continuous use over a predetermined period of time can be suitably met. The molten salt battery 100 does not catch fire or generate a combustible gas due to a reaction with a substance (water etc.) present around the well because an incombustible electrolyte is used.

The molten salt battery 100 includes the vibration controlling portion 30. Therefore, the molten salt battery 100 can be suitably used even under an environment where large vibrations associated with excavation of the well H are given. The molten salt battery 100 can be mounted on the outer surface or the inner surface of the drill string 54, or incorporated into the drill string 54. In any case, the molten salt battery can be formed into a shape compatible with the shape of the drill string 54, for example, a cylindrical shape or arc shape (C shape) which conforms to the cylindrical shape of the drill string 54.

The power supply system including various kinds of sensors 70, the transmitter-receiver 71, the charge-discharge mechanism 72, the energy conversion mechanism 74 and the secondary battery 73 can be applied to not only the drill string 54 in the course of excavation of the well H, but also various kinds of measurement devices and various kinds of tube members (extraction tube for circulating stratum fluids (production fluids) such as an oil and a gas, etc.) which are inserted into the well H in place of the drill string 54 after completion of excavation or in the course of the excavation process. For the secondary battery 73, various conditions as shown below are required according to situations of a well to which the battery is to be applied.

For example, as one operating condition of the secondary battery in the well, operations at a high temperature of 180° C. or higher, or about 225° C. in some cases, may be required. As described previously, the molten salt battery 100 (or B) of this embodiment can be used over a wide operating temperature range, and the highest operating temperature range is set to 140° C. to 300° C. When a molten salt battery having such an operating temperature range is used, the operating condition described above can be suitably met. A molten salt battery having the operating temperature range described above has small self discharge caused by heat, and can be charged by the charge-discharge mechanism 72, so that an operating period condition can be suitably satisfied.

As another operating condition of the secondary battery in the well, constant operations over a long period of time may be required although the operating temperature is not so high (e.g. 60° C. to 150° C.). The molten salt battery 100 of the present invention can be charged by the charge-discharge mechanism 72, so that the operating period condition can be suitably satisfied. The molten salt battery 100 (or B) of the present invention has an operating temperature range of 80° C. to 140° C. or 25° C. to 120° C. as described previously. Therefore, when a molten salt battery having either of the above-mentioned operating temperature ranges is used, the operating condition described above can also be met.

Embodiments that are disclosed herein should be considered illustrative, rather than limiting, in all respects. The scope of the present invention is defined by the appended claims, and all changes are intended to be included within descriptions and scopes equivalent to the appended claims.

The power supply system according to the present invention can be applied to not only wells for extracting an oil or a gas from a conventional oil field or gas field, but also wells for extracting an oil or a gas from a non-conventional oil field or gas field such as an oil shale or an oil sand. The power supply system can also be applied to wells for geothermal development.

The power supply system according to the present invention may supply power to devices other than sensors and communication apparatus, for example, solenoids (actuators) for manipulating various kinds of valves, or may include devices other than sensors and communication apparatus. For example, the power supply system may supply power to a sampling device for sampling stratum fluids. The power supply system itself may be provided in a sampling device, or may supply power to sensors and communication apparatus, solenoids and the like which are provided in the sampling device.

For the molten salt battery, a molten salt principally including sodium ions as a cation is used in the embodiments described above, but a molten salt including lithium ions may be used.

The secondary battery of the present invention does not necessarily have to be a molten salt battery, but other secondary batteries, for example, a lithium ion battery, a sodium-sulfur battery and the like, can be applied as long as conditions of temperature and the like are satisfied.

REFERENCE SIGNS LIST

10: MOLTEN SALT BATTERY BODY (ELECTRIC POWER GENERATION ELEMENT)
20: OUTER PACKAGE
30: VIBRATION CONTROLLING PORTION
70: SENSOR
71: TRANSMITTER-RECEIVER (COMMUNICATION MEANS)
72: CHARGE-DISCHARGE MECHANISM
73: SECONDARY BATTERY
100: MOLTEN SALT BATTERY (MOLTEN SALT ASSEMBLED BATTERY)
B: MOLTEN SALT BATTERY
H: WELL

The invention claimed is:

1. A power supply system for a well comprising:
a secondary battery having an operating temperature range including a temperature of the inside of a well and installed in the well to supply power to a device in the well; and
a charge-discharge mechanism for charging and discharging the secondary battery,
wherein the secondary battery comprises an outer package housing an electric power generation element, and a vibration controlling portion for reducing vibrations given to the outer package, and
wherein the vibration controlling portion comprises a case for housing the outer package and vibration controlling means provided between the case and the outer package, the vibration controlling means including a vibration controlling member in which a heat generator is embedded, wherein the vibration controlling member is configured to absorb the vibrations so that impacts are relieved.

2. The power supply system according to claim 1, further comprising:
an energy conversion mechanism for converting kinetic energy of a fluid passing through a tube member arranged in the well into electrical energy, and supplying the electrical energy to the charge-discharge mechanism.

3. The power supply system for a well according to claim 2,
wherein the energy conversion mechanism includes a screw provided inside the tube member, and a generator for converting rotating power of the screw rotated by the flow of fluids flowing through the tube member into electrical energy.

4. The power supply system for a well according to claim 1, comprising a sensor which is operated by power supplied from the secondary battery.

5. The power supply system for a well according to claim 1, comprising a communication apparatus which is operated by power supplied from the secondary battery.

6. The power supply system for a well according to claim 1, wherein the secondary battery is a molten salt battery.

7. A power supply system for a well comprising:
a secondary battery having an operating temperature range including a temperature of the inside of a well and installed in the well to supply power to a device in the well; and
a charge-discharge mechanism for charging and discharging the secondary battery,
wherein the secondary battery comprises an outer package housing an electric power generation element, and a vibration controlling portion for reducing vibrations given to the outer package,
wherein the vibration controlling portion comprises a case for housing the outer package and vibration controlling means provided between the case and the outer package, the vibration controlling means including an oil which is filled in the case and immerses the outer package, and a support member supporting the outer package on an inside surface of the case.

8. The power supply system for a well according to claim 7, comprising a sensor which is operated by power supplied from the secondary battery.

9. The power supply system for a well according to claim 7, comprising a communication apparatus which is operated by power supplied from the secondary battery.

10. The power supply system for a well according to claim 7, wherein the secondary battery is a molten salt battery.

11. The power supply system according to claim 7, further comprising:
an energy conversion mechanism for converting kinetic energy of a fluid passing through a tube member arranged in the well into electrical energy, and supplying the electrical energy to the charge-discharge mechanism.

12. The power supply system according to claim 11, wherein the energy conversion mechanism includes a screw provided inside the tube member, and a generator for converting rotating power of the screw rotated by the flow of fluids flowing through the tube member into electrical energy.

* * * * *